United States Patent [19]

Nakagawa et al.

[11] Patent Number: 4,902,517

[45] Date of Patent: Feb. 20, 1990

[54] PROCESSES FOR PRODUCING MILK-DERIVED ALCOHOLIC BEVERAGES

[75] Inventors: Yoshikatsu Nakagawa, Kanagawa; Syuzi Kitamura, Tokyo, both of Japan

[73] Assignee: The Calpis Food Industry Co., Ltd., Tokyo, Japan

[21] Appl. No.: 224,264

[22] Filed: Jul. 26, 1988

[30] Foreign Application Priority Data

Dec. 28, 1987 [JP] Japan .................................. 62-329993
Dec. 28, 1987 [JP] Japan .................................. 62-329994
Dec. 28, 1987 [JP] Japan .................................. 62-329995

[51] Int. Cl.$^4$ .............................................. C12G 3/06
[52] U.S. Cl. ......................................... 426/11; 426/42; 426/592; 426/330.4; 426/330.2; 426/330.5
[58] Field of Search ................. 426/7, 11, 15, 16, 592, 426/42, 330.5–330.5

[56] References Cited

U.S. PATENT DOCUMENTS 2,809,113 10/1957 Stimpson et al. .
4,028,470 1/1977 Hayashi et al. ........................ 426/11
4,186,252 1/1980 Silhankova ............................ 426/11

FOREIGN PATENT DOCUMENTS 192 of 1890 United Kingdom .

Primary Examiner—Marianne Cintins
Attorney, Agent, or Firm—Browdy and Neimark

[57] ABSTRACT

Milk-derived alcoholic beverages of fine flavor can be obtained by carrying out alcoholic fermentation under a sufficiently high osmotic pressure. In addition, products having fruit-juice flavor can be obtained by addition of fruit juice to the alcoholic fermented products prepared above. Furthermore, products of further improved flavor can be obtained by addition of the initial distillate fractions of the alcoholic fermented products prepared above to the alcoholic fermented products not provided to said distillation.

19 Claims, No Drawings

PROCESSES FOR PRODUCING MILK-DERIVED ALCOHOLIC BEVERAGES

FIELD OF THE INVENTION

This invention relates to processes for producing milk-derived alcoholic beverages of fine flavor.

Milk-derived alcoholic beverages mean products obtained by fermentation of milk by the action of yeasts, either alone or in combination with lactic acid bacteria, and distilled products therefrom.

In the processes of this invention, alcoholic fermentation is carried out under a sufficiently high osmotic pressure, thereby producing (1) milk-derived alcoholic beverages of markedly improved flavor; further fruit juice is added to the alcoholic fermented products obtained above, thereby producing (2) milk-derived alcoholic beverages with fruit-juice flavor; and furthermore the alcoholic fermented products obtained above are distilled to collect their initial distillate fractions, and the initial distillate fractions are added to the alcoholic fermented products obtained above, thereby producing (3) milk-derived alcoholic beverages of further improved flavor.

The product (2) is a mixture of the product (1) with fruit juice, and the product (3) is a mixture of the product (1) with the initial distillate fraction. Namely, three types of beverages are provided by this invention.

DESCRIPTION OF THE PRIOR ART

Conventionally, milk-derived alcoholic beverages have been manufactured by alcoholic fermentation of milk by the action of yeasts, either alone or in combination with lactic acid bacteria, and products of higher alcohol content have been rarely produced by distilling the thus obtained alcoholic fermented products.

Problems to be Solved

Milk-derived alcoholic beverages produced by the conventional methods have a strong yeasty odor and lack a good fermentation flavor. This makes it difficult to put the conventional products to popular use as drinks.

The object of this invention is to provide milk-derived alcoholic beverages which are free of yeasty odor and show improved fermentation flavor.

Means to Solve the Problems

Intensive studies on how to improve the flavor of milk-derived alcoholic beverages have led us to find that products which are free of yeasty odor and have improved fermentation flavor can be obtained if the alcoholic fermentation is carried out under a sufficiently high osmotic pressure.

This invention relates to a process for producing milk-derived alcoholic beverages, which comprises adding, to lactic acid fermented milk or acid-added milk, one or more of osmotic-pressure boosting substances in an amount that corresponds to 15 to 50% by weight of sucrose as explained hereafter; further adding, as required, one or more of saccharides assimilable by an alcohol yeast; and subjecting the mixture thus obtained to fermentation by said alcohol yeast under the resulting sufficiently high osmotic pressure.

This invention also relates to a process for producing milk-derived alcoholic beverages mixed with fruit juice, which comprises adding, to lactic acid fermented milk or acid-added milk, one or more of edible osmotic pressure-boosting substances (i.e., osmotic pressure-increasing solutes) in an amount that corresponds to 15 to 50% by weight of sucrose as explained hereafter; further adding, as required, one or more of saccharides assimilable by an alcohol yeast; subjecting the mixture thus obtained to fermentation by said alcohol yeast under the resulting sufficiently high osmotic pressure; and adding fruit juice to the alcoholic fermented product obtained.

This invention further relates to a process for producing milk-derived alcoholic beverages, which comprises adding, to lactic acid fermented milk or acid-added milk, one or more of osmotic pressure-boosting substances in an amount that corresponds to 15 to 50% by weight of sucrose as explained hereafter, further adding, as required, one or more of saccharides assimilable by an alcohol yeast; subjecting the mixture thus obtained to fermentation by said alcohol yeast under the resulting sufficiently high osmotic pressure; distilling an adequate amount of the thus obtained alcoholic fermented product to collect its initial distillate fraction; and adding the initial distillate fraction to the remaining alcoholic fermented product not used for said distillation or to the same alcoholic fermented product prepared separately as above-mentioned.

In the three types of processes above-mentioned, "an alcohol yeast" means one kind (single use) or more kinds (combination use) of alcohol yeasts.

Conventionally, milk-derived alcoholic beverages have been manufactured by adding a small amount of sugar to cow's milk or the like and subjecting the resulting mixture to alcoholic fermentation by the action of yeasts. However the products thus obtained have a strong yeasty odor in addition to fermentation flavor peculiar to alcoholic fermented milk.

This problem can be avoided by the processes of this invention, in which the alcoholic fermentation is carried out using acid milk added with high osmotic pressures of the same level as can be obtained when 15 to 50% by weight of sucrose is added to pure water as explained hereafter.

The lactic acid fermented milk used in this invention is prepared by subjecting skim milk or skim milk reconstituted from powdered or condensed skim milk with water, to fermentation by the action of lactic acid bacteria; both the living lactic acid bacteria-containing and not containing ones may be used. The acid-added milk used in this invention is prepared by adding one or more of acids, such as lactic, citric, tartaric, gluconic and phosphoric acids, to the above-mentioned skim milk or reconstituted skim milk.

As typical examples of the osmotic pressure-boosting substances to be added to the milk which will be subjected to alcoholic fermentation, there may be mentioned monosaccharides such as glucose, fructose and high fructose corn syrup, disaccharides such as sucrose, lactose and maltose, and polyhydric alcohols such as sorbitol and mannitol. Besides these, salts of organic and inorganic acids, as well as amino acids such as sodium glutamate, glycine and alanine, may also be used for this purpose. In the processes of this invention, one or more of such osmotic pressure-boosting substances as mentioned above are added in an amount that will generate the same level of osmotic pressure as that produced by 15 to 50% by weight of sucrose as explained below. In using plural osmotic pressure-boosting substances, said "an amount" means the total amount thereof.

It is extremely difficult to exactly determine the osmotic pressure of a solution containing a variety of substances like the lactic acid fermented milk and acid-added milk. However, what is required in the processes of this invention is to increase the osmotic pressure of the system, i.e., to add, to the osmotic pressure of the lactic acid fermented or acid-added milk, the same magnitude of osmotic pressure as that generated by the addition of 15 to 50% by weight of sucrose to pure water. The osmotic pressure values measured agree with those obtained by calculation. Ths osmotic pressure-boosting substances mentioned above have different molecular weights and some of them dissociate in water; hence, the amount (% by weight) to be added varies with the type of substances. The amount of the substance to give the same magnitude of osmotic pressure as that obtained by the addition of 15 to 50% by weight of sucrose to pure water, may be roughly calculated from molecular weight and degree of dissociation in water. The same is true of mixtures thereof (e.g., sucrose and glucose; sucrose, amino acid and sodium chloride; and sucrose, glucose, mannitol and amino acid), in which their suitable amounts can be calculated from molecular weight, dissociation degree in water and mixing ratio so as to accord with the same osmotic pressure as that obtained by the addition of 15 to 50% by weight of sucrose to pure water. The thus employed substance or mixture is added to the lactic acid fermented or acid-added milk. Generally, however, the amount of each substance or mixture to be added can be easily determined by means of an osmometer.

Under a sufficiently high osmotic pressure thus achieved, it is possible to obtain products of fine flavor and free of yeasty odor.

In the processes of this invention, when the osmotic pressure-boosting substance added is not assimilable by the yeast used, an assimilable saccharide is further added in an amount needed for the alcohol fermentation. Glucose, maltose, fructose or liquid sugar is generally used for this purpose in an amount of about 5 to 35% by weight, preferably about 15 to 31% by weight. These assimilable saccharides may be used alone or in combination thereof.

As the alcohol yeast, may be used strains belonging to the genus Saccharomyces, Kluyveromyces, Candida or Torulopsis, etc. and capable of producing alcohol under a high osmotic pressure. Illustrative examples are:
*Saccharomyces cerevisiae* IFO 0305,
*Kluyveromyces africans* IFO 1671,
*Candida albicans* IFO 1060, and
*Torulopsis candida* IFO 0768.

Alcoholic fermentation in the processes of this invention may be carried out under conditions favorable for the growth of the yeast. An outstanding feature of the processes of this invention is that evolution of disagreeable odor due to excessive fermentation is not observed without strict control of culture temperature as required in alcoholic fermentation under normal osmotic pressure. There is no specific limitation upon the culture temperature and time for the processes of this invention. With the lactic acid fermented milk to which 30% by weight of sucrose has been added, for example, alcoholic fermentation at 10 to 30° C. for 1 to 60 days gives products of fine flavor and free of yeasty odor (alcohol content: about 4 to 23% by volume).

The alcoholic fermented products thus obtained can be provided as milk-derived alcoholic beverages without further treatment.

Sugars, acidulants, viscosity regulators and other additives may be adequately added to adjust the taste of final products as desired.

In the second aspect of this invention, fruit juice is added to the alcoholic fermented products; various fruit juice may be employed.

Preferable examples of the fruit juice are grape fruit juice, orange juice, apple juice, mandarin orange juice, pine juice and concentrated products thereof, which are added preferably in an amount of about 10 to 50% by weight as juice content.

Sugars, acidulants, viscosity regulators and other additives may be adequately added to adjust the taste of final products as desired.

Addition of the fruit juice makes the alcoholic fermented products more palatable.

In the third aspect of this invention, the initial distillate fractions of the alcoholic fermented products are added to the alcoholic fermented products. The alcoholic fermented products used for the distillation may be the same alcoholic fermented products. A part of the alcoholic fermented product may be used to collect its initial distillate fraction and the obtained initial distillate fraction may be added to the remaining part of the alcoholic fermented product. Vacuum distillation is carried out under a pressure of about 60 mmHg using a pot still. The initial distillate fraction to be collected is preferably 2% by weight or less of the alcoholic fermented product charged for distillation. The initial distillate fraction is added preferably in an amount of about 2 to 10% by weight of the alcoholic fermented product to which it is added.

Sugars, fruit juice, acidulants, viscosity regulators and other additives may be adequately added to adjust the taste of final products as desired.

Addition of the initial distillate fraction gives products of further improved flavor.

The following Examples will further illustrate the invention. These Examples are not intended to limit the scope of the invention.

EXAMPLE 1

*Lactobacillus bulgaricus* (IFO 13953) was inoculated to skim milk (solid content: 8.6% by weight) previously subjected to UHT sterilization at 135° C. for three seconds, and static culture was continued at 38° C. for 21 hours, giving a bulk starter.

Skim milk (solid content: 8.6% by weight) prepared by skimming raw milk was sterilized at 90° C. for 30 seconds and immediately cooled to 38° C., the starter obtained above was added in an amount of 3% by weight, and fermentation was continued at 38° C. for 20 hours, giving 50 kg of lactic acid fermented milk. Separately, a brewing yeast was inoculated to skim milk previously sterilized in an autoclave at 121° C. for 10 minutes, and cultivation was continued at 25° C. for 40 hours with stirring (100 rpm), giving 2 kg of yeast starter.

The lactic acid fermented milk obtained above was mixed with 25 kg of granulated sugar (sucrose content: 99.8% by weight) and 23 kg of water, 2 kg of the yeast starter was added to the resulting mixture, and alcoholic fermentation was continued at 16° C. for 35 days, giving alcoholic fermented milk with an alcohol content of 13% by volume.

EXAMPLE 2

*Lactobacillus bulgaricus* (IFO 13953) was inoculated to skim milk (solid content: 8.6% by weight) previously sterilized by heating to 90° C., and static culture was continued at 37° C. for 18 hours, giving a bulk starter.

Skim milk (solid content: 8.6% by weight) prepared by skimming raw milk was sterilized at 90° C. for 30 seconds and immediately cooled to 37° C., the starter obtained above was added in an amount of 3% by weight, and fermentation was continued at 37° C. for 21 hours, giving 4.5 kg of lactic acid fermented milk. Separately, *Saccharomyces cerevisiae* (IFO 0305) was inoculated to skim milk previously sterilized in an autoclave at 121° C. for 10 minutes, and cultivation was continued at 28° C. for 40 hours with stirring (100 rpm), giving 150 g of yeast starter.

The lactic acid fermented milk obtained above was mixed with 2.1 kg of granulated sugar (sucrose content: 99.8% by weight) and 0.75 kg of water, 150 g of the yeast starter was added to the resulting mixture, and alcoholic fermentation was continued at 20° C. for 10 days, giving 7.5 kg of alcoholic fermented milk with an alcohol content of 9% by volume.

To 7.5 kg of this alcoholic fermented milk, were added 6 kg of granulated sugar (sucrose content: 99.8% by weight), 2.5 kg of condensed grape-fruit juice (6-fold concentrate), 11 kg of alcohol (alcohol content: 48% by volume, this alcohol is for brewages.), 5.7 kg of 3.5% pectin solution, 0.3 kg of 30% sodium citrate solution and 17 kg of water, and the resulting mixture was subjected to heating sterilization at 80° C. for five minutes and then homogenized, giving 50 kg of final product. Its pH was 3.91 and alcohol content was 13.3% by volume.

EXAMPLE 3

*Lactobacillus bulgaricus* (IFO 13953) was inoculated to skim milk (solid content: 8.6% by weight) previosuly heated at 90° C. for 10 minutes, and static culture was continued at 37° C. for 20 hours, giving a bulk starter.

Skim milk (solid content: 8.6% by weight) prepared by skimming raw milk was sterilized at 90° C. for 30 seconds and immediately cooled to 38° C., the starter obtained above was added in an amount of 3% by weight, and fermentation was continued at 38° C. for 20 hours, giving 120 kg of lactic acid fermented milk.

Separately, *Saccharomyces cerevisiae* (IFO 0305) was inoculated to skim milk previously sterilized in an autoclave at 121° C. for 10 minutes, and cultivation was continued at 25° C. for 40 hours with stirring (100 rpm), giving 6 kg of yeast starter.

The lactic acid fermented milk obtained above was mixed with 51 kg of granulated sugar (sucrose content: 99.8%) and 23 kg of water, 6 kg of the yeast starter was added to the resulting mixture, and alcoholic fermentation was continued at 15° C. for 35 days, giving 200 kg of alcoholic fermented milk with an alcohol content of 13% by volume.

This alcoholic fermented milk (180 kg) was distilled under a pressure of 60 mmHg (distillation temperature: 35° to 45° C.; cooling water temperature: 18° C.) using a pot still, and the initial distillate fraction (0.98 liter) was collected from 32.7 liters of total distillate.

To 20 kg of the alcoholic fermented milk not used for distillation, were added 3.43 kg of 3.5% pectin solution, 0.37 kg of 30% sodium citrate solution, 5.31 kg of water, and 0.98 liter (0.89 kg) of the initial distillate fraction obtained above. The resulting mixture was homogenized at 10° C., subjected to heating sterilization at 70° C. for 10 minutes, and again homogenized, giving 30 kg of final product of very fine flavor.

What is claimed is:

1. A process for producing milk-derived alcoholic beverages, which comprises adding, to lactic acid fermented milk or acid-added milk, at least one edible osmotic pressure-increasing solute in an amount effective to increase the osmotic pressure of said lactic acid fermented milk or acid-added milk by the same magnitude of osmotic pressure as that of a 15 to 50% by weight solution of sucrose in pure water, and subjecting the mixture thus obtained to fermentation by at least one kind of alcohol yeast capable of alcoholic fermentation of said at least one osmotic pressure-increasing solute.

2. A process for producing milk-derived alcoholic beverages according to claim 1, wherein said at least one osmotic pressure-increasing solute is selected from the group consisting of monosaccharides, disaccharides, polyhydric alcohols, amino acids, and salts.

3. A process for producing milk-derived alcoholic beverages mixed with fruit juice, which comprises adding, to lactic acid fermented milk or acid-added milk, at least one edible osmotic pressure-increasing solute in an amount effective to increase the osmotic pressure of said lactic acid fermented milk or acid-added milk by the same magnitude of osmotic pressure as that of a 15 to 50% by weight solution of sucrose in pure water, and at least one saccharide alcoholically fermentable by at least one kind of alcohol yeast, subjecting the mixture thus obtained to fermentation by said one kind of alcohol yeast, and adding fruit juice to the alcoholic fermented product obtained above.

4. A process for producing milk-derived alcoholic beverages according to claim 3, wherein said at least one saccharide is selected from the group consisting of glucose, maltose, fructose, and high fructose corn syrup.

5. A process for producing milk-derived alcoholic beverages according to claim 3, wherein said at least one osmotic pressure-increasing solute is selected from the group consisting of monosaccharides, disaccharides, polyhydric alcohols, amino acids, and salts.

6. A process for producing milk-derived alcoholic beverages, which comprises (a) adding, to lactic acid fermented milk or acid-added milk, at least one edible osmotic pressure-increasing solute in an amount effective to increase the osmotic pressure of said lactic acid fermented milk or acid-added milk by the same magnitude of osmotic pressure as that of a 15 to 50% by weight solution of sucrose in pure water, (b) subjecting the mixture thus obtained to fermentation by at least one kind of alcohol yeast capable of alcoholically fermenting said at least one osmotic pressure-increasing solute, (c) distilling a portion of the alcoholic fermented product obtained above to collect an initial distillate fraction therefrom, and adding the obtained initial distillate fraction to an undistilled alcoholic fermented product produced according to steps (a) and (b).

7. A process for producing milk-derived alcoholic beverages according to claim 6, wherein said at least one osmotic pressure-increasing solute is selected from the group consisting of monosaccharides, disaccharides, polyhydric alcohols, amino acids, and salts.

8. A process for producing milk-derived alcoholic beverages according to claim 6, wherein the portion distilled in said step (c) is prepared independently of said undistilled alcohlic fermented product to which it is added.

9. A process for producing milk-derived alcoholic beverages according to claim 6, wherein the initial distillate fraction is obtained by adding, to lactic acid fermented milk or acid-added milk, at least one edible osmotic pressure-increasing solute in an amount effective to increase the osmotic pressure of said lactic acid fermented milk or acid-added milk by the same magnitude of osmotic pressure as that of a 15 to 50% by weight solution of sucrose in pure water, and at least one saccharide alcoholically fermentable by at least one kind of alcohol yeast, subjecting the mixture thus obtained to fermentation by said at least one kind of alcohol yeast, and distilling a portion of the alcoholic fermented product thus obtained to collect said initial distillate fraction therefrom.

10. A process for producing milk-derived alcoholic beverages, which comprises adding, to lactic acid fermented milk or acid-added milk, at least one edible osmotic pressure-increasing solute in an amount effective to increase the osmotic pressure of said lactic acid fermented milk or acid-added milk by the same magnitude of osmotic pressure as that of a 15 to 50% by weight solution of sucrose in pure water, and at least one saccharide alcoholically fermentable by at least one kind of alcohol yeast, and subjecting the mixture thus obtained to fermentation by said at least one kind of alcohol yeast.

11. A process for producing milk-derived alcoholic beverages according to claim 10, wherein said at least one osmotic pressure-increasing solute is selected from the group consisting of monosaccharides, disaccharides, polyhydric alcohols, amino acids, and salts.

12. A process for producing milk-derived alcoholic beverages according to claim 10, wherein said at least one saccharide is selected from the group consisting of glucose, maltose, fructose, and high fructose corn syrup.

13. A process for producing milk-derived alcoholic beverages mixed with fruit juice, which comprises adding, to lactic acid fermented milk or acid-added milk, at least one edible osmotic pressure-increasing solute in an amount effective to increase the osmotic pressure of said lactic acid fermented milk or acid-added milk by the same magnitude of osmotic pressure as that of a 15 to 50% by weight solution of sucrose in pure water, subjecting the mixture thus obtained to fermentation by at least one kind of alcohol yeast which can alcoholically ferment said at least one osmotic pressure-increasing solute, and adding fruit juice to the alcoholic fermented product obtained above.

14. A process for producing milk-derived alcoholic beverages according to claim 13, wherein said at least one osmotic pressure-increasing solute is selected from the group consisting of monosaccharides, disaccharides, polyhydric alcohols, amino acids, and salts.

15. A process for producing milk-derived alcoholic beverages, which comprises
    (a) adding, to lactic acid fermented milk or acid-added milk, at least one edible osmotic pressure-increasing solute in an amount effective to increase the osmotic pressure of said lactic acid fermented milk or acid-added milk by the same magnitude of osmotic pressure as that of a 15 to 50% by weight solution of sucrose in pure water, and at least one saccharide alcoholically fermentable by at least one kind of alcohol yeast,
    (b) subjecting the mixture thus obtained to fermentation by said at least one kind of alcohol yeast,
    (c) distilling a portion of the thus obtained alcoholic fermented product to collect an initial distillate fraction therefrom, and adding the obtained initial distillate fraction to an undistilled alcoholic fermented product obtained according to steps (a) and (b).

16. A process for producing milk-derived alcoholic beverages according to claim 15, wherein said at least one saccharide is selected from the group consisting of glucose, maltose, fructose, and high fructose corn syrup.

17. A process for producing milk-derived alcoholic beverages according to claim 15, wherein said at least one osmotic pressure-increasing solute is selected from the group consisting of monosaccharides, disaccharides, polyhydric alcohols, amino acids, and salts.

18. A process for producing milk-derived alcoholic beverages according to claim 15, wherein the portion distilled in said step (c) is prepared independently of the undistilled alcoholic fermented product to which it is added.

19. A process for producing milk-derived alcoholic beverages according to claim 15, wherein the initial distillate fraction is obtained by adding, to lactic acid fermented milk or acid-added milk, at least one edible osmotic pressure-increasing solute in an amount effective to increase the osmotic pressure of said lactic acid fermented milk or acid-added milk by the same magnitude of osmotic pressure as that of a 15 to 50% by weight solution of sucrose in pure water, subjecting the mixture thus obtained to fermentation by at least one kind of alcohol yeast capable of alcoholically fermenting said at least one osmotic pressure-increasing solute, and distilling a portion of the alcoholic fermented product thus obtained to collect said initial distillate fraction therefrom.

* * * * *